United States Patent [19]
Willi et al.

[11] Patent Number: 5,390,987
[45] Date of Patent: Feb. 21, 1995

[54] BRAKE SYSTEM METERING VALVE WITH A PRESSURE ACTUATED BRAKE SWITCH

[75] Inventors: Gary A. Willi, Ann Arbor; James M. Cossins, Taylor, both of Mich.

[73] Assignee: Kelsey-Hayes Company, Romulus, Mich.

[21] Appl. No.: 28,480

[22] Filed: Mar. 8, 1993

[51] Int. Cl.⁶ ............................................... B60T 8/26
[52] U.S. Cl. ...................... 303/9.62; 303/9.63; 303/9.72; 303/9.74; 303/9.75; 303/113.5; 303/84.1
[58] Field of Search ............... 303/9.62, 9.63, 9.72, 303/9.73, 9.74, 9.69, 113.5, 111, DIG. 3, DIG. 4, 113.5, 113.1, 84.1; 188/1.11

[56] References Cited

U.S. PATENT DOCUMENTS

| | | | |
|---|---|---|---|
| 3,480,333 | 11/1969 | Stelzer | 303/9.63 |
| 3,549,212 | 12/1970 | Leiber | 303/DIG. 4 |
| 3,749,451 | 8/1973 | Edsall | 303/9.74 |
| 3,825,308 | 7/1974 | Kasselmann et al. | 303/DIG. 4 |
| 3,937,523 | 2/1976 | Ayers, Jr. et al. | 303/9.72 |
| 3,980,345 | 9/1976 | Doerfler | 303/9.63 |
| 4,046,426 | 9/1977 | Miyake | 303/DIG. 4 |
| 4,068,900 | 1/1978 | Doerfler et al. | 303/9.72 |
| 5,127,713 | 7/1992 | Birkenbach | 303/113.1 |

FOREIGN PATENT DOCUMENTS

| | | | |
|---|---|---|---|
| 2164399 | 3/1986 | United Kingdom | 303/9.71 |

*Primary Examiner*—Matthew C. Graham
*Attorney, Agent, or Firm*—MacMillan, Sobanski & Todd

[57] ABSTRACT

A hydraulic brake system metering valve includes an intergal brake switch having at least one pair of contacts. The brake switch contacts are movable between two positions. The combination valve includes a metering valve assembly having an axially shiftable metering rod. One end of the metering rod is adapted to operate the switch contacts. When pressure is initially applied to the brake system the metering rod shifts, causing the brake switch contacts to move from a first to a second position and thereby generate a first electrical signal. Upon release of the brake pressure, the metering rod shifts back, allowing the brake switch contacts to return to the first position and thereby generate a second electrical signal.

11 Claims, 4 Drawing Sheets

BRAKE SYSTEM METERING VALVE WITH A PRESSURE ACTUATED BRAKE SWITCH

BACKGROUND OF THE INVENTION

This invention relates in general to vehicle hydraulic brake systems and in particular to a brake system metering valve.

In "vertically" split vehicle hydraulic brake systems, a dual master cylinder is provided and includes separate front and rear brake hydraulic fluid reservoirs and actuating chambers. The actuating chambers are connected by hydraulic lines to the vehicle front and rear wheel brakes, defining separate front and rear brake circuits. Depressing a brake pedal connected by a mechanical linkage to the master cylinder applies hydraulic pressure to both brake circuits to apply the front and rear wheel brakes and slow the vehicle. Brake systems further include a normally open, or normally closed, brake light switch which is typically mounted adjacent to the brake pedal linkage. Movement of the linkage when the brake pedal is depressed actuates the brake light switch to illuminate the vehicle stop light lamps. The brake light switch is known to perform other functions, such as interrupting the vehicle cruise control.

During brake application, the weight of the vehicle shifts from the the rear wheels to the front wheels. This weight shift requires a greater braking force from the front wheel brakes than from the rear wheel brakes. Accordingly, vehicles typically have higher efficiency disk brakes for the front wheels and conventional drum brakes for rear wheels. Additionally, vehicles can include a proportioning valve in the rear brake circuit between the master cylinder and the rear wheel brakes. The proportioning valve functions to apply pressure to the rear wheel brakes at a lower pressure than is applied to the front wheel brakes.

The brake system also can include a metering valve inserted in the front brake circuit between the master cylinder and the front wheel brakes. The metering valve functions to delay application of the front wheel disk brakes until the hydraulic pressure has increased sufficiently to overcome the rear wheel drum brake return springs. Without a metering valve, the front disk brakes would be applied before the rear drum brakes, causing the front brakes to provide all the braking force during easy stops and thereby accelerating wear of the disk brake pads.

Brake systems having a dual master cylinders also typically include a differential pressure valve connected between the front and rear brake circuits to monitor the pressure therein. A difference in pressures sensed between the brake circuits is indicative of a component failure in the brake system and actuates a pressure differential switch to illuminate a brake failure warning light.

It is known to integrate the functions of the proportioning and metering valves and the pressure differential switch into one structure, commonly referred to as a combination valve. Such combination valves are adapted to be installed between the master cylinder and the wheel brakes.

Currently many vehicle brake systems also include anti-lock braking devices. Brake systems so equipped are referred to as anti-lock brake systems (ABS). Anti-lock brake systems typically include an ABS control valve which can be included in the brake system between the combination valve and the wheel brakes. An ABS computer control module controls the control valve to modulate the hydraulic pressure applied to the wheel brakes in response to signals generated by wheel speed sensors to prevent wheel lock-up during braking cycles. The ABS computer control module is actuated, or armed, when the brakes are applied.

It is known in the art to use the vehicle brake light switch to generate an arming signal for the ABS. In such a system, the brake light switch is electrically connected to the ABS control module. Actuation of the brake light switch generates a first electrical signal which is used to arm the ABS control module. Similarly, deactuation of the brake light switch upon release of the brake pedal generates a second electrical signal to disarm the ABS control module. Because the brake light switch is typically located remotely from the ABS control module, additional wiring is usually required to connect the brake light switch to the computer.

Typically, the ABS computer control module monitors the condition of the brake light switch. If the brake light switch remains actuated for longer than a predetermined time period, the control module decides that the brake light switch is defective and illuminates an ABS failure warning light. This is intened to preclude continual operation of the ABS if the brake light switch has failed.

SUMMARY OF THE INVENTION

This invention relates to an improved hydraulic brake system combination valve which includes a pressure actuated brake switch. The pressure actuated brake switch generates an electrical signal to actuate an anti-lock brake system (ABS) when pressure is initially applied to the hydraulic brake system.

The improved combination valve includes a housing having front and rear inlet parts adapted to be connected to corresponding sections of the master cylinder and front and rear outlet ports adapted to be connected to the corresponding wheel brakes. The valve housing includes a first bore formed therein which communicates with the rear brake inlet and outlet ports. A conventional proportioning valve assembly is disposed within the first bore between the rear brake inlet and outlet ports. The valve housing further includes a second bore formed therein which communicates with the rear brake inlet port and the front brake inlet and outlet ports. A conventional metering valve assembly is disposed within the second bore between the front brake inlet and outlet ports. A conventional differential pressure switch assembly is disposed within the second bore between the proportioning and metering valve assemblies. The outer ends of the bores are closed by removable proportioning valve and metering valve assembly end plugs. The metering valve assembly end plug includes an axial bore formed therethrough.

The metering valve assembly includes an axially movable metering rod which has an outer end extending through the metering valve end plug bore. The metering valve end plug has an outer collar that receives the base of an electrical brake switch. The collar is crimped about the brake switch to secure the switch to the combination valve housing. The brake switch includes a set of electrical contacts which are electrically connected to an ABS computer control module. The metering rod end extends into the brake switch and engages the contacts.

When hydraulic pressure is initially applied to the combination valve, the metering rod shifts in an outward direction to prevent fluid communication between the front brake inlet and outlet ports. As the metering rod shifts, the outer end moves the switch contacts from a first position to a second position, thereby generating an electrical signal to arm the ABS control module. The metering valve assembly is further operable to allow communication between the front brake inlet and outlet ports when a predetermined pressure greater than the initial pressure is applied to the front brake inlet port. However, the switch contacts remain in the second position as long as hydraulic pressure is supplied to the front brake inlet port.

Upon release of the hydraulic pressure, the metering rod shifts back to its original position, allowing the brake switch contacts to return from the second position to the first position. As the switch contacts return to the first position, a second signal is generated to disarm the ABS control module.

The end plug further includes a radial bore which can receive a pin to disable movement of the metering rod for maintenance operations. This allow the metering valve to be blocked in an open position during service bleeding of the front wheel brakes.

The brake switch can be adapted to operate the vehicle stop light lamps and other electrically controlled systems in place of the conventional mechanical brake light switch.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
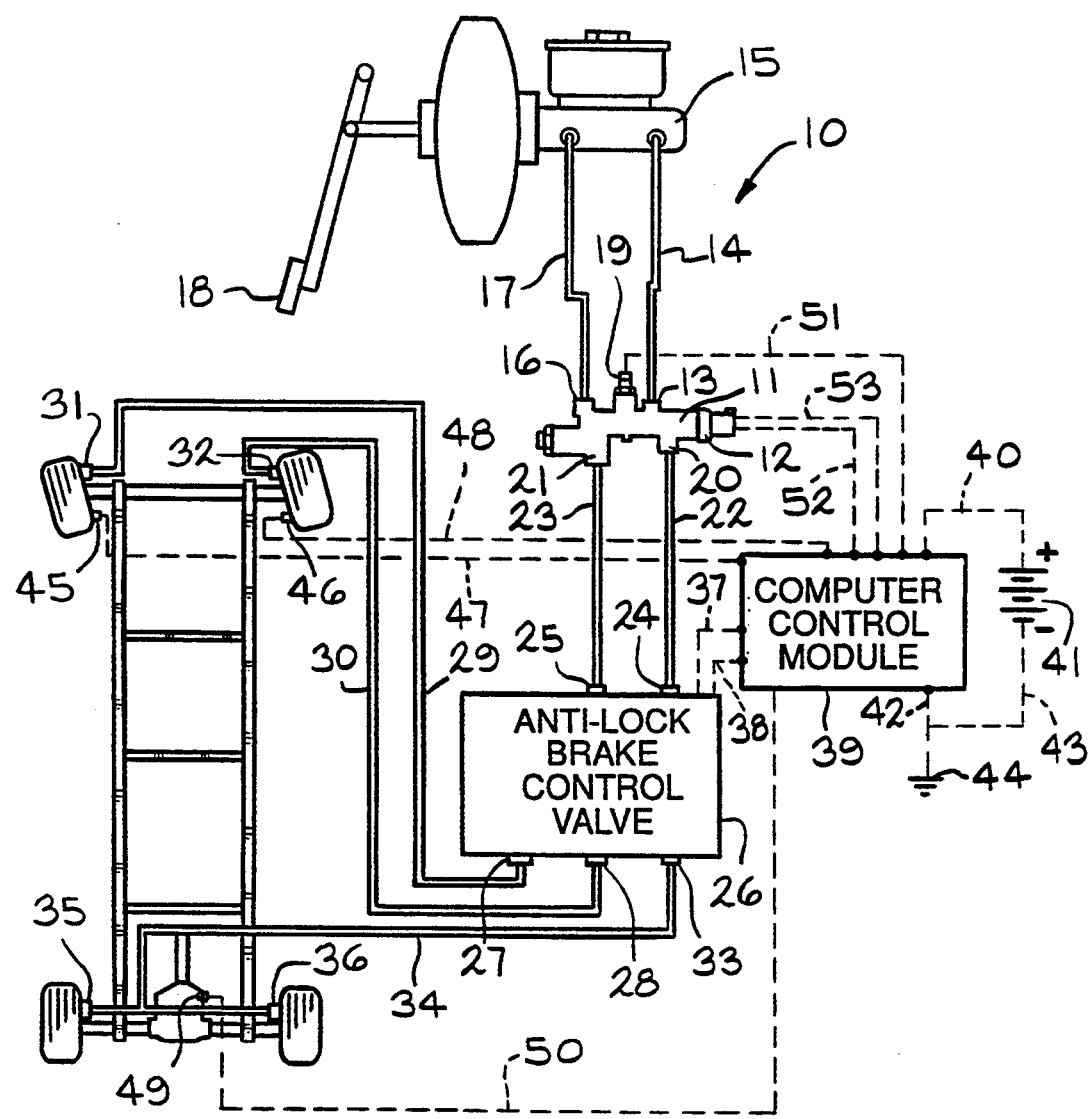
FIG. 1 is a schematic diagram of a vehicle anti-lock brake system including a combination valve in accordance with this invention.

Referring now to the drawings, there is illustrated in FIG. 1 a schematic diagram of a typical vehicle anti-lock brake system (ABS), indicated generally at 10. It should be noted that, in FIG. 1, hydraulic connections between system components are indicated by solid lines while electrical connections are indicated by dashed lines. As is typical with many vehicle brake systems, the brake system 10 includes disk type wheel brakes (not shown) for the front wheels and drum type wheel brakes (not shown) for the rear wheels.

The brake system 10 has an improved combination valve 11 which, in accordance with this invention, includes an integral brake switch 12. As will be discussed, the improved combination valve 11 functions to reduce the hydraulic pressure applied to the rear wheel brakes, delay initial application of the front wheel brakes and detect failure of brake system hydraulic components. The combination valve 11 has a front brake inlet port 13 connected through a front brake hydraulic connection 14 to a front brake actuating chamber (not shown) of a dual master cylinder 15. Similarly, the combination valve 11 has a rear brake inlet port 16 connected through a rear brake hydraulic connection 17 to a rear brake actuating chamber (not shown) of the master cylinder 15. The master cylinder 15 is operated by a brake pedal 18 to deliver brake fluid under pressure through the hydraulic connections 14 and 17 to the combination valve 11.

The combination valve 11 includes a conventional differential pressure switch 19 which generates an electrical signal upon failure of a hydraulic component in the brake system 10. The combination valve 11 has a front brake outlet port 20 and a rear brake outlet port 21 which are connected through hydraulic lines 22 and 23, respectively, to front and rear brake inlet ports 24 and 25 of an ABS control valve 26.

The ABS control valve 26 has a pair of front brake outlet ports 27 and 28 connected through left and right hydraulic connections 29 and 30 to left and right front wheel brakes 31 and 32. The ABS control valve 26 also has a rear brake outlet port 33 connected through a rear hydraulic connection 34 to the left and right rear wheel brakes 35 and 36.

The ABS control valve 26 is controlled through electrical connectors 37 and 38 by a computer control module 39. The ABS control module 39 receives power through an electrical connector 40 from the vehicle electrical system, represented by a storage battery 41 in FIG. 1. Both the control module 39 and the battery 41 are connected through electrical connectors 42 and 43, respectively, to a common vehicle ground 44.

The control module 39 receives signals generated by left and right front wheel speed sensors 45 and 46 through electrical connectors 47 and 48, respectively. Similarly, signals generated by a single rear wheel speed sensor 49 are transmitted through an electrical connector 50 to the control module 39. The control module 39 receives electrical signals from the differential pressure switch 18 through an electrical connector 51. The brake switch 12 is connected to the control module 39 by a pair of electrical connectors 52 and 53.

The operation of the ABS 10 is conventional in the art. As will be described below, upon initial application of hydraulic pressure to the brake system 10 by the master cylinder 15, the brake switch 12 generates a first electrical signal to actuate the control module 39. The control module 39 then controls the ABS control valve 24 to modulate the hydraulic brake pressure delivered to the wheel brakes 31, 32, 35 and 36 to prevent wheel lock-up during braking cycles. An example of one type of control valve 26 and control module 39 are disclosed in U.S. Pat. No. 4,865,399, which is herein incorporated by reference. As will also be described below, upon release of the hydraulic pressure, the brake switch 12 generates a second electrical signal to disarm the control module 39.

Figure 2:
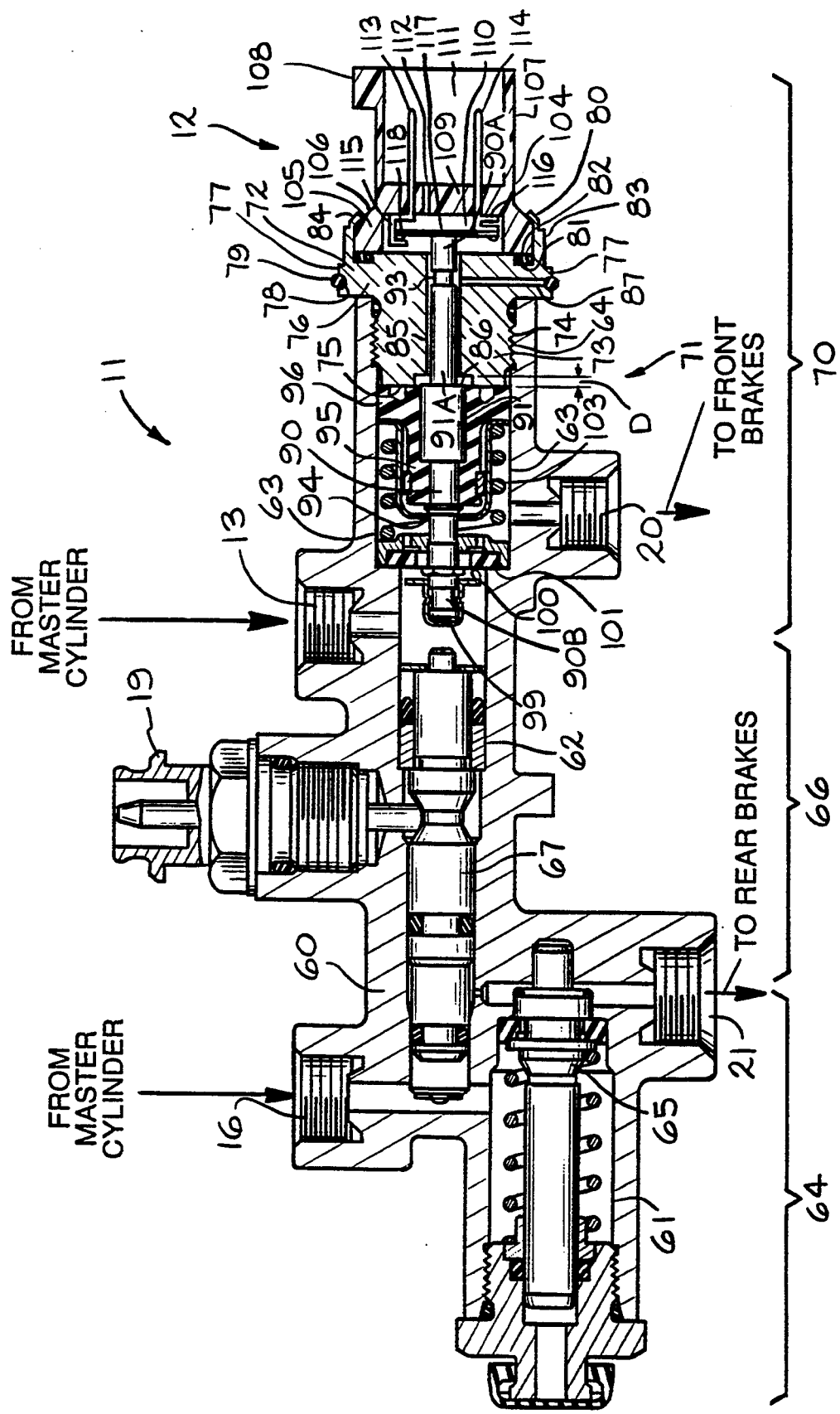
FIG. 2 is a sectional view of the combination valve shown in FIG. 1.

A sectional view of the improved combination valve 11 is shown in FIG. 2. The combination valve 11 has a housing 60 which includes a first bore 61 extending into the left end of the housing 60 as shown in FIG. 2. The first bore 61 communicates through internal passageways formed in the housing 60 with the rear brake inlet and outlet ports 16 and 21. The housing also includes a second bore 62 extending into the right end of the housing 60 as shown in FIG. 2. The second bore 62 has a counterbored portion 63 which includes a threaded outer end portion 64. The second bore 62 communicates through internal passageways formed in the housing 60 with the front and rear brake inlet ports 13 and 16. Similarly, the counterbored portion 63 communicates through an internal passageway with the front brake outlet port 20.

A proportioning valve assembly 64 is disposed in the first bore 60 between the rear brake inlet and outlet ports 16 and 21. The proportioning valve assembly 64 is conventional in the art and includes a spring biased poppet valve 65. The proportioning valve assembly 64 is similar to the proportioning valve shown in U.S. Pat. No. 3,937,523, which is herein incorporated by reference. The proportioning valve assembly 64 functions to apply a proportionally lower hydraulic pressure to the rear wheel brakes than to the front wheel brakes.

The combination valve 11 also includes a pressure differential valve assembly 66 which is shown in the center portion of FIG. 2. The differential valve assembly 66 has a slidable differential piston 67 disposed in the second bore 62 between the front and rear brake inlet ports 13 and 16. The differential valve assembly 66 is similar to the differential valve shown in U.S. Pat. No. 3,480,333, which is herein incorporated by reference. An imbalance in hydraulic pressure between the front and rear inlet ports 13 and 16 acts to displace the differential piston 67 and thereby cause the differential switch 18 to generate an electrical signal. Such a hydraulic pressure imbalance is indicative of a failure in the brake system 10.

The combination valve 11 further includes a metering valve and brake switch assembly 70 disposed in the counterbore 63 between the front brake inlet and outlet ports 13 and 20. The assembly 70 has a metering valve portion 71 which is similar to the metering valve shown in the above mentioned U.S. Pat. No. 3,480,333.

The metering valve portion 71 includes an end plug 72 formed from steel, or other similar material, and having a generally cylindrical shape. The end plug 72 has a reduced diameter inner end portion 73 which is received by the counterbore 63. The inner end portion 73 includes external threads 74 which engage the threaded portion 64 of the counterbore 63. The inner end portion 73 also includes an inner surface 75 which is perpendicular to the axis of the counterbore 63.

The end plug 72 has a center portion 76 adjacent to the valve housing 60. The center portion 76 has a plurality of flat surfaces 77 formed about the circumference thereof to facilitate the insertion and tightening of the end plug 72 into the counterbore 63. A circumferential annular groove 78 is formed in the flat surfaces 77 about the center portion 76. The groove 78 receives an O-ring 79, the purpose for which will be explained below. The center portion 76 defines an outer surface 80 which is perpendicular to the axis of the counterbore 63. An annular groove 81 formed about the outer edge of the surface 80 receives a resilient seal 82, such as an O-ring, the purpose for which will be explained below.

The end plug 72 further includes an outer portion comprising a cylindrically shaped collar 83 extending outwardly to the right in FIG. 2. The collar 83 includes a thinner annular portion 84 formed at the outer end thereof. The purpose for the collar 83 and annular portion 84 will be explained below.

The end plug 72 has a axial central bore 85 formed therethrough. An annular recess 86 having a depth "D" is formed in the inner plug surface 75 concentrically with the axial bore 85. A radial bore 87 is formed through the plug center portion 76 between the axial bore 85 and the center portion annular groove 81.

A metering rod 90 is disposed within the end plug central bore 85 and extends axially through the counterbore 63. The metering rod 90 is illustrated in FIG. 2 in a position corresponding to no hydraulic pressure being applied to the combination valve 11. The metering rod has an outer end 90A extending outwardly to the right in FIG. 2 from the end plug 72 and an inner end 90B extending to the left into the end of the valve housing bore 62. The metering rod 90 also includes a larger diameter central portion 91 having an outer end 91A adjacent to the recess 86 formed in the end plug inner surface 75. The outer end 91A defines a shoulder 92. The metering rod 90 further includes an annular groove 93 formed adjacent to the inner of the end plug radial bore 87.

Within the counterbore 63, the metering rod 90 extends through an aperture 94 formed through a flexible diaphragm 95, formed of rubber or other suitable material. The aperture 94 forms a fluid seal about the metering rod 90. The diaphragm 95 includes an outer flanged end 96 which forms another fluid seal against the end plug inner surface 75. The fluid seals prevent any hydraulic fluid from reaching the end plug 72. The metering rod inner end 90B is surrounded by hydraulic fluid while, as will be described below, the outer end 90A is in communication with the atmosphere.

The metering rod inner end 90B carries a metering valve cap 99 having a flanged end 100 and a metering valve plate and seat 101 which are of conventional design. A compression spring 103 is disposed about the metering rod 90 between the valve plate and seat 100 and the diaphragm flanged end 96.

In accordance with this invention, the metering valve assembly 70 includes an electrical brake switch 12. The brake switch 12 includes a housing 104 formed from a non-conductive material, such as a plastic. The housing 104 has a cylindrically shaped end portion 105 which is received by the end plug collar 77. The switch end portion 105 includes a tapered portion 106 over which the collar outer end portion 84 is crimped, securing the switch 12 to the end plug 72. The resilent seal 82 contained in the annular groove 81 in the end plug outer surface 80 forms a seal between the end plug 72 and the switch 12 which functions to keep dirt and moisture out of the switch 12.

The switch housing 104 further has a conventionally shaped connector portion 107 which includes includes a tab 108 for securing a conventional vehicle electrical connector (not shown) to the switch 12. The housing 104 also includes an interior wall 109 formed perpendicular to the axis of the valve housing counterbore 63. The interior wall 109 defines inner and outer chambers 110 and 111. A vent passageway 112 is formed through the interior wall 109 and communicates with the inner and outer chambers 110 and 111.

Upper and lower male connector prongs 113 and 114 are mounted opposite one another within the switch housing 104 and pass from the outer chamber 111 through the interior wall 109 and into the inner chamber 110. The upper prong 113 has a U-shaped shaped end portion 115 contained within the inner chamber 110. The lower prong 114 has an inner end 116 contained within the inner chamber 110 which carries a resilent electrically conductive strip 117. The conductive strip 117 extends across the inner chamber 110 and engages the U-shaped end portion 115 of the upper prong 113 to form a set of switch contacts 118. The conductive strip 117 is slightly bowed (not shown) to maintain the engagement with the U-shaped end portion 115 of the upper prong 113. Thus, the switch contacts 118 are normally in a first position in which they are together, forming a normally closed switch. The outer end 90A of the metering rod 90 is adjacent to the conductive strip 117 and can be in contact with same.

The operation of the metering valve and brake switch assembly 70 will now be described. As mentioned above, the assembly 70 is included in the brake system 10 illustrated in FIG. 1 having disk brakes for the front wheel brakes and drum brakes for the rear wheel brakes. In the brake system 10, the metering valve portion 71 of the assembly 70 functions to delay application of the front wheel brakes 31 and 32 until until the hydraulic pressure increases sufficiently to compress the rear wheel brake shoe return springs (not shown). Thus, the metering valve portion 71 causes the front disk brakes 31 and 32 and the rear drum brakes 35 and 36 to be applied at the same time.

When the brake pedal 18 is initially depressed, pressurized hydraulic fluid from the master cylinder 15 compresses the diaphragm 95 which shifts the metering rod 90 to the right in FIG. 2. The travel of the metering rod 90 is limited by the depth "D" of the recess 86 formed in the end plug inner surface 75. However, the travel is sufficient for the outer end 90A of the metering rod 90 to deflect the conductive strip 117, thereby opening the switch contacts 118 and defining a second switch position. The depth of the recess 86 limits the travel of the metering rod 90 to assure that the conducting strip 117 does not contact the outer side of the U-shaped end portion 115 and thereby reclose the switch 12.

As mentioned above, the switch 12 is connected through the electrical connectors 52 and 53 to the computer control module 39. Thus, when hydraulic pressure is applied to the system 10 by the master cylinder 15, the switch contacts 118 are opened, generating a first electrical signal which arms the ABS. The use of a normally closed switch 12 allows for an integrity check of the switch 12 and the connectors 52 and 53 to assure that they are operational. Accordingly, when the brakes are not applied, the control module 39 continually checks the connector 52 and switch 12. Should the switch 12 appear to be open during one of these checks, the control module 39 causes an ABS failure warning light (not shown) to be illuminated to warn the driver.

As the metering rod 90 is shifted to the right, the inner end 90B carries the metering valve cap flange 100 into contact with the metering valve plate and seat 101. This closes the metering valve portion 71 of the assembly 70 and blocks the flow of hydraulic fluid therethrough until the hydraulic pressure increases sufficiently to compress the spring 103. When the spring 103 compresses, the valve plate and seat 101 is shifted to the right in FIG. 2, opening the metering valve assembly 71 and reestablishing fluid communication between the front brake inlet port 13 and the front brake outlet port 20. However, as the valve plate and seat 101 is shifted, the metering rod 90 does not move and continues to hold the switch contacts 188 in an open position.

Upon release of the brake pedal 18, the hydraulic pressure at the inlet port 13 is reduced, allowing the spring 103 to expand and shift the valve plate and seat 101 to the left in FIG. 2. to reclose the metering valve portion 71. However, the hydraulic pressure at the outlet port 20 is now greater than the hydraulic pressure at the inlet port 13. This pressure differential shifts the cap flange 100 and the cap 99 the left in FIG. 2 sufficiently to reopen the metering valve portion 71. However, the hydraulic pressure in the counterbore 63 continues to compress the diaphragm 95, causing the metering rod 90 to maintain the switch contacts 118 in an open position.

As the hydraulic fluid in the front brake circuit returns through the metering valve portion 71 to the master cylinder 15, the hydraulic pressure in the counterbore 63 decreases. When the hydraulic pressure in the counterbore 63 has been reduced sufficiently, the diaphragm 95 resumes its normal shape, moving the metering rod 90 fully to the left in FIG. 2. Movement of the metering rod 90 to the left allows the flexible conductive strip 117 to reengage the U-shaped end portion 115 of the upper prong 113 and reclose the switch contacts 118. When the switch contacts 118 reclose, a second electrical signal is generated which disarms the ABS.

The metering valve assembly 71 can be temporarily disabled for maintenance operations, such as service bleeding of the front wheel brakes 31 and 32. To disable the valve assembly 71, the O-ring 79 is removed from the groove 78 formed in the center portion 76 of the end plug 72. A pin (not shown) is then inserted through the radial bore 87 and into engagement with the annular recess 93 formed in the metering rod 90. The pin prevents any axial movement of the metering rod 90 as the brake pedal 18 is stroked during the bleeding operation. Preventing movement of the metering rod 90 blocks the metering valve assembly 71 in an open position, allowing service bleeding of the front wheel brakes 31 and 32. Once the maintenance operation is completed, the O-ring 79 is reinserted into the groove 78 to prevent dirt and moisture from entering the metering valve and brake switch assembly 70.

The brake switch 12 will operate if a brake system failure causes loss of the hydraulic fluid in the front brake circuit. In such a case, application of the brakes will increase the pressure in the rear brake circuit, causing the differential piston 67 to shift to the right in FIG. 2. The end of the differential piston 67 will contact the cap 99 and inner end 90B of the metering rod 90. The pressure in the rear brake circuit will urge both the differential piston 67 and the metering rod 90 to the right, opening the switch contacts 118.

While the switch 12 has been described above as being used to arm an ABS, other uses for the switch 12 are also possible. For example, the switch 12 can be electrically connected to a central vehicle computer (not shown). The signal generated by the switch 12 when hydraulic pressure is applied would be used by the vehicle computer to operate other vehicle systems, such as the stop lamps or interruption of the cruise control. Thus, the pressure actuated switch 12 can be used in place of the mechanically actuated brake light switch currently used for these functions. The pressure actuated switch 12 is believed to have greater reliability than the mechanical switch and requires no adjustments.

Furthermore, it is known that some drivers rest their left foot on the brake pedal 18 while driving. Due to free travel in the linkage connecting the brake pedal 18 to the master cylinder 15, this action may depress the brake pedal 18 sufficiently to actuate the mechanical switch without applying hydraulic pressure to the vehicle brake system. This would falsely light the stop light lamps and interrupt the cruise control. In addition, in prior art ABS using the mechanical brake light switch to arm the ABS, a signal would be continually sent to the ABS control module 39 to arm the ABS. Such a continuous signal would cause the control module 39 to decide that the brake light switch is continuously actuated and therefore is defective. Accordingly, the control module 39 would then illuminate the ABS failure warning light. Because the pressure actuated brake switch 12 only opens upon application of hydraulic pressure to the brake system 10, these problems are avoided.

Figure 3:
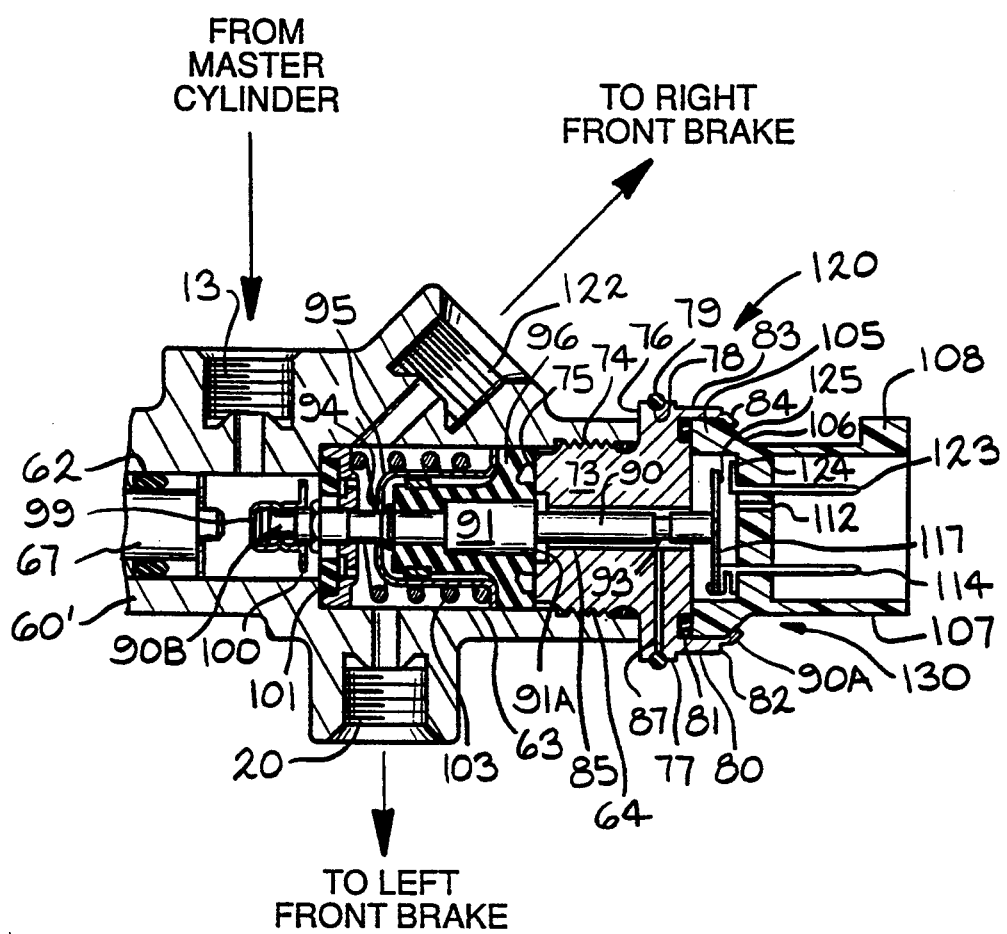
FIG. 3 is a partial sectional view of an alternate embodiment of the combination valve shown in FIG. 2.

An alternate embodiment 120 of the improved combination valve is illustrated in a partial sectional view shown in FIG. 3. The alternate embodiment 120 is adapted for use in a conventional non-anti-lock brake system shown generally at 121 in FIG. 4. Components shown in FIGS. 3 and 4 that are identical to the components shown in FIGS. 2 and 1 are numbered the same. Only the portion of the combination valve 120 including the metering valve assembly 71 is shown in FIG. 3 since the proportioning and differential switch portions 64 and 66 are the same as shown in FIG. 2.

Figure 4:
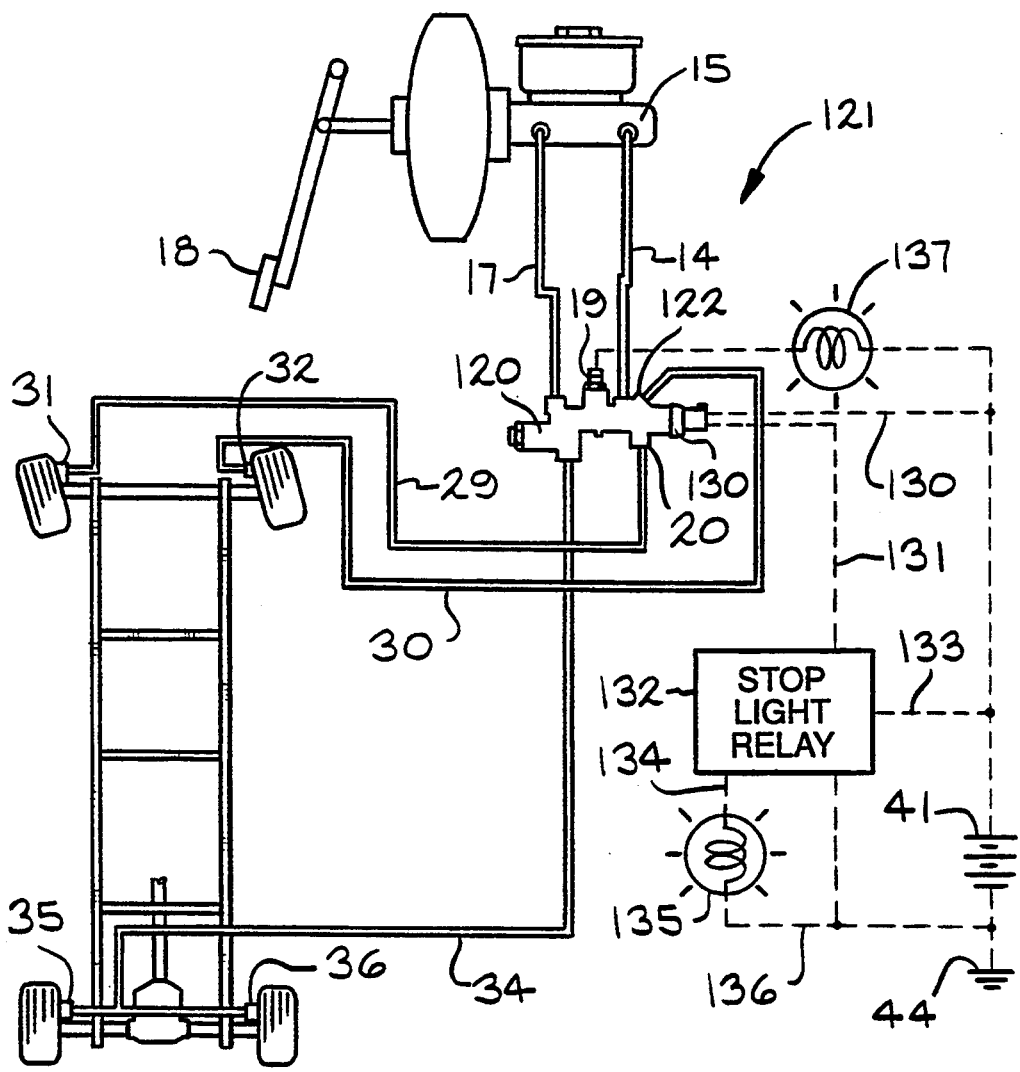
FIG. 4 is a schematic diagram of a conventional vehicle brake system including the alternate embodiment of the combination valve shown in FIG. 3.

The alternate embodiment 120 includes a second front brake outlet port 122 formed in the valve housing 60'. Similar to the first front brake outlet port 20, the second front brake outlet port 122 communicates with the counterbore 63. Thus, the metering valve assembly 71 is disposed between the inlet port 13 and both the first and second outlet ports 20 and 121. As shown in FIG. 4, the first brake outlet port 20 is connected through the left hydraulic connection 29 to the left front wheel brake 31. Similarly, second brake outlet port 122 is connected through the right hydraulic connection 30 to the right front wheel brake 32.

The alternate embodiment 120 also includes an upper male connector prong 123 having an inner end formed in a L-shape as a first switch contact 124. The lower male connector prong 114 again carries a resilient electrically conductive strip 117. A second switch contact 125 is formed at the upper end of the conductive strip 117. The second contact 125 is spaced apart from the first switch contact 124. Thus, the alternate embodiment 120 includes a normally open electrical switch 130.

The upper switch prong 123 is connected through an electrical connector 130 to the vehicle battery 41. The lower switch prong 114 is connected through an electrical connector 131 to a solenoid coil (not shown) included in a stop light relay 132. The stop light relay coil is connected to ground 44 through an electrical connector 133. The relay 132 includes a set of normally open contacts (not shown) which are closed when the relay coil is energized. One side of the contacts are connected through an electrical connector 133 to the battery 41. The other side of the contacts are connected through an electrical connector 131 to at least one stop lamp 135 which is connected through electrical connector 136 to the ground 44. While only one stop lamp 135 is shown in FIG. 4, it is to be understood that the stop light relay 132 typically controls a plurality of stop lights (not shown).

The battery 44 is shown in FIG. 4 as being connected through a brake failure warning light 137 to the differential pressure switch 19. The differential pressure switch is connected to the ground 44 through the combination valve housing 60 (not shown).

When the brake pedal 18 is depressed, the metering rod 90 shifts to the right in FIG. 3 causing the second switch contact 125 to engage the first switch contact 124 and thereby close the switch 130. This energizes the stop light relay coil causing the relay contacts to close and illuminate the stop light lamp 135. Likewise, when the brake pedal is released, the metering rod 90 shifts back to the left in FIG. 3 allowing the switch 130 to reopen. Reopening of the switch 130 deenergizes the relay coil allowing the relay contacts to reopen. This extinguishes the stop light lamp 135. This is similar to a conventional brake switch which is typically actuated by mechanical movement of the brake pedal 18. As with conventional mechanically actuated brake switches, the brake switch 130 also can be used to disengage a cruise control and other similar systems.

The brake switch 130 also can be used to directly illuminate the stop light lamp 135 by omitting the relay 132 and connecting the lower prong 114 directly to the lamp 135. However, this increases the current passing through the brake switch 130. Similarly, the brake switch 130 can be connected to the car computer (not shown), in which case the switch 130 generates a signal to the computer and the computer then controls the operation of the stop light lamp 135.

A third embodiment of the invention (not shown) is contemplated which includes the normally closed brake switch 12 described above mounted in the valve housing 60' which has two front brake outlet ports 20 and 120. This embodiment could be used in a vehicle equipped with a rear wheel ABS and conventional front wheel brakes. As described above, the brake switch 12 would generate an arming signal for the ABS upon application of hydraulic pressure to the brake system. The two front brake outlet ports 20 and 120 would supply hydraulic fluid to the front wheel brakes in a conventional manner.

It is to be appreciated that the embodiments of the invention described above also can be applied to a metering valve per se. Thus, the metering valve and brake switch assembly does not have to be included as a part of a combination valve, but can be a structurally separate component of the braking system.

The principle and mode of operation of this invention have been described and illustrated in its preferred embodiment. However, it must be understood that the invention may be practiced otherwise than as specifically explained and illustrated without departing from its spirit or scope. For example, the combination valve 11 has been described as being structurally separate from the ABS control valve 26. However, the combination valve 11 (or just the metering valve portion) can be directly attached to the control valve 26 or built integrally into the control valve 26. Furthermore, while the invention has been described in terms of a vertically split hydraulic brake system, it will be appreciated that the invention is also applicable to a diagonally split hydraulic brake system. If the diagonally split brake system does not include a metering valve per se, a pressure actuated brake switch can be included within the anti-lock brake control valve.

What is claimed is:

1. A valve for a vehicle hydraulic brake system having a master cylinder and at least one wheel brake, the valve comprising:
    a valve housing having a bore formed therein, said housing including an inlet port formed therein and communicating with said bore, said inlet port adapted to be connected to the master cylinder, said housing further including an outlet port formed therein and communicating with said bore, said outlet port adapted to be connected to the wheel brake;

a brake switch attached to said housing; and a metering valve disposed within said valve housing bore between said inlet and outlet ports, said metering valve operable to prevent communication between said inlet and outlet ports when hydraulic pressure is initially applied to said inlet port, said metering valve connected to a shiftable metering valve element disposed within said valve housing bore to actuate said brake switch, said shiftable metering valve element being shifted when hydraulic pressure is initially applied to said inlet port to actuate said brake switch.

2. The valve as described in claim 1 wherein the vehicle brake system also includes anti-lock brake means connected to said outlet port and adapted to be connected to the vehicle wheel brake, and further wherein said anti-lock brake means is actuated by said brake switch.

3. The valve as described in claim 1 wherein said brake switch has at least one pair of contacts being movable from a first position to a second position to generate an electrical signal.

4. The valve as described in claim 3 wherein said electrical signal is a first signal and further wherein said contacts are movable from said second position to said first position to generate a second electrical signal when hydraulic pressure is reduced at said inlet port.

5. The valve as described in claim 4 wherein the vehicle brake system also includes anti-lock brake means connected to said outlet port and adapted to be connected to the vehicle wheel brake, and further wherein said anti-lock brake means is actuated by said first electrical signal and deactuated by said second electrical signal.

6. The valve as described in claim 3 wherein said contacts are closed in said first position and open in said second position.

7. The valve as described in claim 3 wherein said contacts are open in said first position and closed in said second position.

8. The valve as described in claim 1 further including means for temporarily disabling movement of said shiftable element within said bore.

9. The valve as described in claim 1 further including proportioning valve means connected between the master cylinder and a rear wheel brake.

10. The valve as described in claim 9 further including pressure differential valve means disposed within said valve housing between said metering valve means and said proportioning valve means, said pressure differential valve means generating an electrical signal when the hydraulic pressure applied to said metering valve means differs from the pressure applied to said proportioning valve means.

11. The valve described in claim 10 wherein said differential valve means includes a shiftable element, said shiftable element shifting to engage and shift said shiftable metering valve element to actuate said brake switch when the hydraulic pressure applied to said proportioning valve means exceeds the hydraulic pressure applied to said metering valve.

* * * * *